United States Patent [19]

Gaylord et al.

[11] 4,203,181
[45] May 20, 1980

[54] CANOPY RELEASE MANIPULATING HANDLE

[75] Inventors: John A. Gaylord, San Diego; Kenneth A. Marks, Cherry Valley, both of Calif.

[73] Assignee: H. Koch & Sons Division, Gulf & Western Manufacturing Company, Anaheim, Calif.

[21] Appl. No.: 935,166

[22] Filed: Aug. 21, 1978

[51] Int. Cl.$^2$ .................... B64D 17/30; A44B 11/25
[52] U.S. Cl. ............................ 24/230 A; 244/151 A
[58] Field of Search ................ 24/230 A; 244/151 A, 244/151 B

[56] References Cited

U.S. PATENT DOCUMENTS

| | | | |
|---|---|---|---|
| 3,330,014 | 7/1967 | Gaylord | 24/230 A |
| 3,541,650 | 11/1970 | Gaylord | 24/230 A |

Primary Examiner—Bernard A. Gelak
Attorney, Agent, or Firm—George B. White

[57] ABSTRACT

The releasable strap connector has a female connector and male connector, the latter having one or more prongs insertable in pockets of the female connector; a rocking bar has cut-away portions intersecting said pockets to interlock with correspondingly cut-away portions of the prongs of the male member, and a manipulating yoke lever for rocking the bar into a releasing position where the bar is withdrawn from said prongs. The yoke lever has a manipulating handle which includes one or more plungers projectable from the hollow handle into suitable keepers in the frame of the female member to positively hold the yoke lever in position corresponding to the interlocking position of the locking bar and optionally also to hold the lever in position corresponding to the releasing position of the rocking bar; each plunger being urged outwardly by a spring and is retracted inwardly of the hollow handle by coacting slanted groove and pin which respond to manual rotation of a sleeve to retract the plunger and when released to permit the spring to return the plunger to a projecting locking position; the sleeve is rotatable relatively to the hollow handle, which latter is partly cut-away to expose the rotating sleeve for manipulation.

9 Claims, 8 Drawing Figures

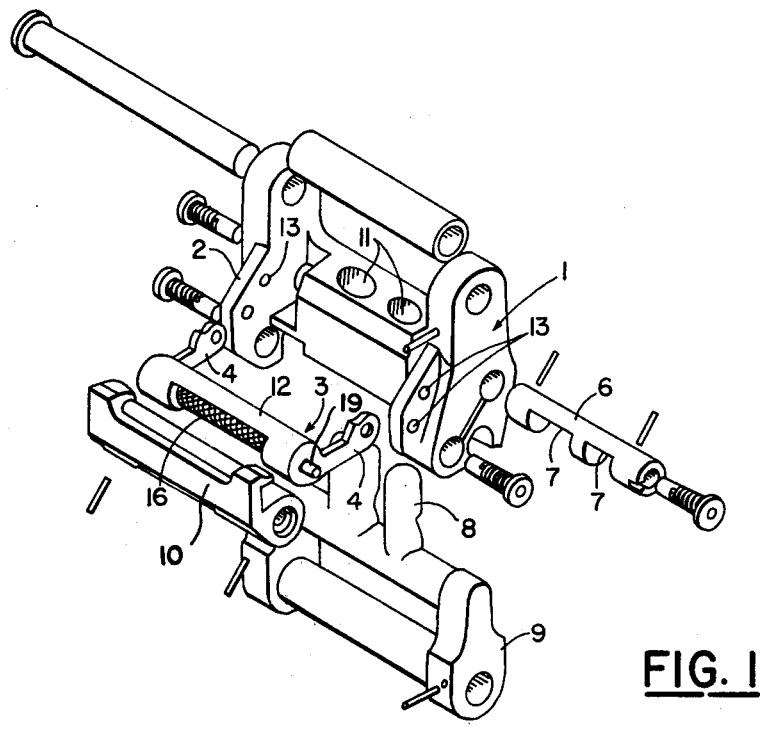
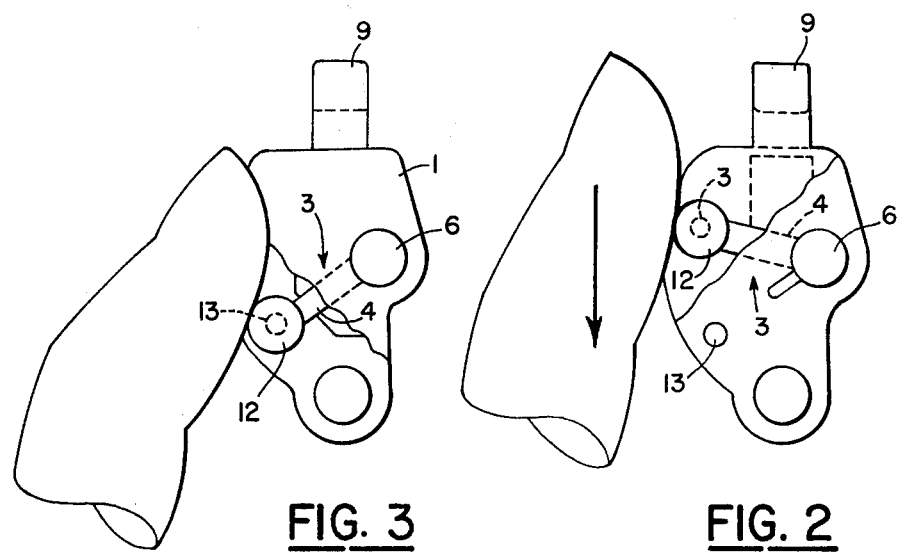

CANOPY RELEASE MANIPULATING HANDLE

STATE OF THE ART

The general construction of the releasable strap connector of the type on which the herein manipulating handle is used, is illustrated in U.S. Pat. No. 3,330,014 granted to John A. Gaylord in 1967, wherein the yoke lever manipulates the locking bar and the herein invention takes the place of the manipulating bar of the yoke lever of that patent.

The primary object of the invention is to provide a positive safety lock for the yoke lever which holds the locking bar in locking position in such a manner that it resists any shock or other force which tends to dislodge the yoke lever from its locking position, and which positive locking means can be easily released by a natural rolling motion of the hand of the operator whereby the locking elements are retracted from locking position and remain retracted while the yoke lever is moved to rock the rocking bar into releasing position.

Another object of the invention is to provide an easily manipulatable handle for the lever which rocks the rocking bar into and out of interlocking position, which handle is particularly a cross member engageable by the thumb of the operator, whereby a facile turning or rotation of a rotating element retracts the locking members to release the lever, the releasing being accomplished in a single operation and by the same movement as the turning of the lever from locking into releasing attitude.

BRIEF DESCRIPTION OF THE DRAWINGS

FIG. 1 is a perspective view of the pertinent parts of the releasable strap connector illustrating the relative arrangement of the manipulating handle.

FIG. 2 is a somewhat diagrammatic view illustrating the engagement of the thumb of the operator for the initial turning of the releasing mechanism of the handle.

FIG. 3 is a diagrammatic view illustrating the continuing movement and force exerted by the thumb for moving the released handle and the lever into the releasing position.

DETAILED DESCRIPTION

Figure 4:
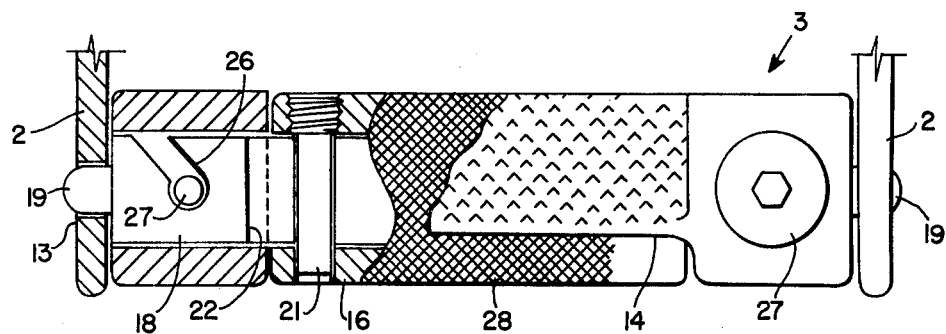
FIG. 4 is a cut-away top view partly in section showing the handle in locking position.

In the usual releasable strap connector the female member 1, as shown in FIG. 1, has a pair of ears 2 between which is a yoke lever 3, the legs 4 of which extend along the inside of the ears 2 and have suitable engagement with the opposite ends of a rocking bar 6. The rocking bar 6 has suitable shoulders 7 formed by cut-away portions to be engaged by recesses in interlocking prongs 8 on the male connecting member 9. The prongs 8 are inserted through suitable holes 11 which in the operative position intersect the cut-away portion of the rocking bar. The function of the yoke lever 3 is to rock the bar 6 from interlocking position and vice versa, namely, to rock the bar 6 so as to align the shoulders 7 with the holes 11 in nonobstructing position to allow the withdrawal of the prongs 8, or to return the bar 6 so that the shoulders 7 project into the holes 11 for engagement with the recesses in the prongs 8. The outer ends of the yoke lever legs 4 are connected by a handle 12 which has the device cooperating with keeper holes 13 in the ears 2 for selectively locking or unlocking the yoke lever 3 in the releasing or obstructing positions of the bar 6.

Figure 5:
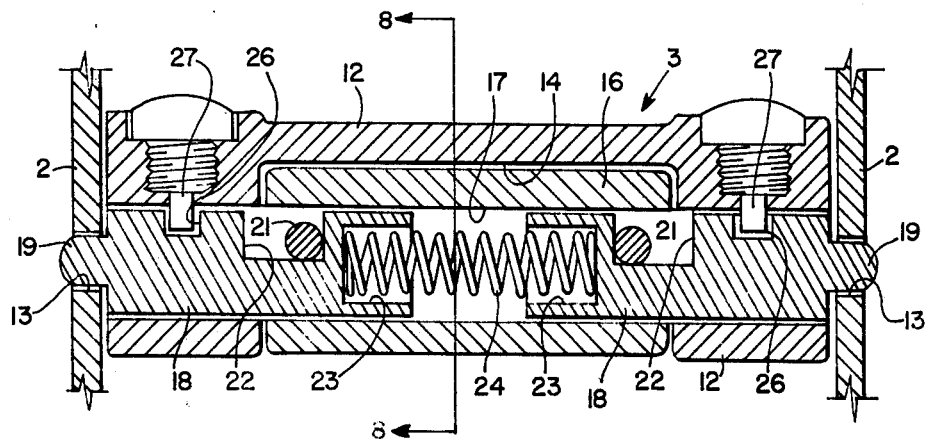
FIG. 5 is a longitudinal partly sectional view of the manipulating handle.
Figure 6:
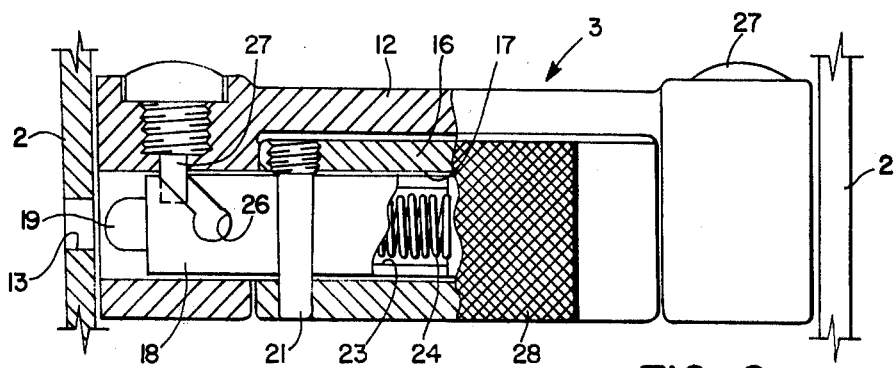
FIG. 6 is a cut-away front view of the handle showing the handle in unlocking position.
Figure 7:
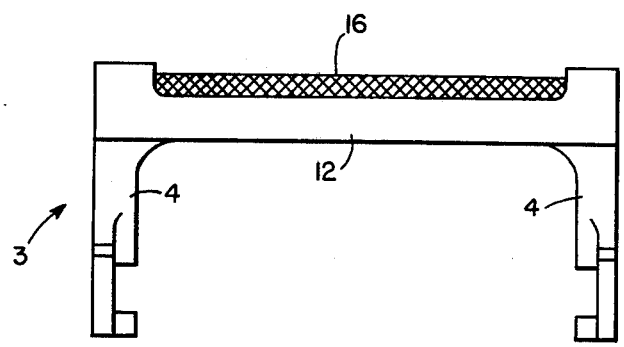
FIG. 7 is a detail view of the lever.
Figure 8:
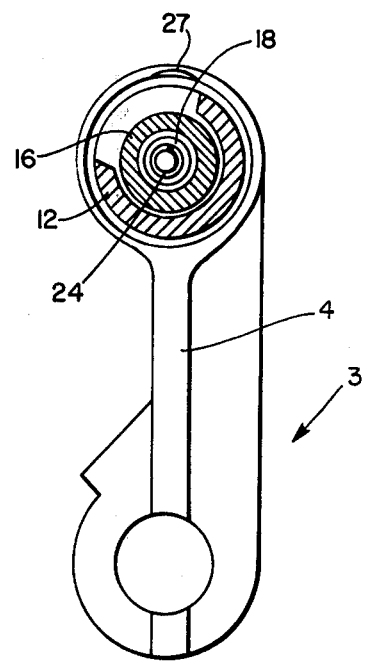
FIG. 8 is a sectional view of the lever on lines 8—8 of FIG. 7.
Figure 9:
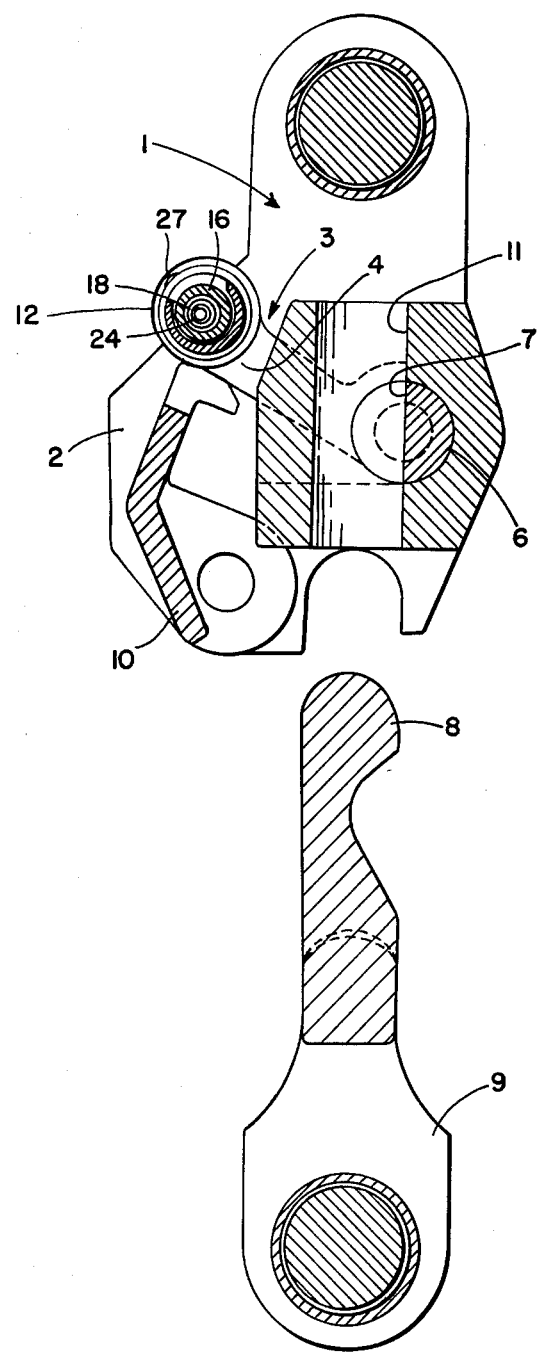

In the embodiment of the device shown in FIGS. 4, 5, and 6 the handle 12 is hollow and has a pocket 14 to accomodate a roller sleeve 16. The roller sleeve 16 has a passage 17 therethrough in which are oppositely slideable bolt elements in the form of pins 18 terminating in buttons 19 fitting into the respective keeper holes 13 to interlock the roller sleeve 16 and the handle 12 with the ears 2 of the female member 1. The stroke of movement of the pins 18 inwardly and outwardly is limited by a cross pin 21 extending across the roller sleeve 16 and through an elongated slot 22 in each pin 18 so that at the extended or retracted position of the pin the respective ends of the slot 22 abut against the cross pin 21. The inner end of each pin 18 has a recess 23 to hold in position a coil spring 24 bearing against the opposite pins 18 and urging them outwardly from the passage 17.

The retracting of the pins 18 into unlocking position is accomplished by a slanted substantially spiral or inclined slot 26 in each pin 18 riding on a guide pin 27 which latter is threaded into the handle 12 so as to project into the slot 26. The outer circumference 28 of the roller sleeve 16 is knurled so that it can be easily manipulated and as it is rotated it causes the inclined slots 26 to ride on the guide pins 27 and retract the pins 18 into unlocking position. This permits very facile manipulation because the surface of the roller sleeve 16 is exposed through the cut-away portion of the handle 12 and as the operator rotates the roller sleeve 16 the hand remains in position to engage the handle 12 to move it away from the holes 13 from the position shown in FIG. 2, into an inoperative position shown in FIG. 3, in one continuous movement. In certain instances, it may be desirable to lock the yoke lever also in the releasing position of the rocking bar 6, and for this purpose another set of holes 13 is provided in the connector ears 2 corresponding to the position of the lever legs 4 to the releasing position of the rocking bar 6.

We claim:

1. In a manipulating handle for a releasable strap connector, said strap connector having a female member with spaced ears, and having socket holes therethrough to receive male connector members, an oscillatable locking bar intersecting said socket holes and being adapted to engage said male members in one position and to release said male members in another position, and a lever between said ears connected to the locking bar for oscillating the same between said engaging and releasing positions, the improvement of
a manipulating handle on the lever including
a hollow member on said lever,
said ears having a keeper socket at least in one of said ears,
at least one bolt element axially reciprocable in said hollow member, a portion of said bolt element being insertable in said keeper pocket for interlocking said handle member and said ear in said engaging position of said lever and of said oscillatable bar, a rotatable manipulating member in said hollow member being at least partially exposed to the exterior of said hollow member to an extent sufficient for manual engagement for rolling manipulation, and connecting means between said bolt element, said hollow member and said manipulating member for reciprocating said bolt element upon rotation of said rotatable manipulating member thereby to withdraw said bolt element from said keeper pocket and thereby to permit manipulating of said lever.

2. The manipulating handle specified in claim 1, and resilient means to normally urge said bolt element toward said keeper pocket.

3. The manipulating handle specified in claim 2, and said connecting means including a coacting pin and groove connection between said hollow member and said bolt element and rotational connection between said manipulating member and said bolt element whereby rotation of said manipulating member causes reciprocation of said bolt element.

4. The handle specified in claim 3, and said groove being an angle groove in said bolt element and said pin extending from said hollow member into said groove.

5. The manipulating handle specified in claim 1, or 2, or 3, or 4, and
said lever having legs extended substantially along said ears,
and said hollow member being connected between said legs and having an open portion exposing the exterior of said manipulating member in manipulatable attitude,
the connection between said manipulating member and said bolt element being such that said bolt element is slideable relative to said manipulating member to the limits of its locking and unlocking attitude.

6. The manipulating handle specified in claim 1, or 2, or 3, or 4, and
there being a bolt element in each end of the hollow member,
said resilient means being between said bolt elements urging them in opposite directions to one another outwardly.

7. The manipulating handle specified in claims 1, or 2, and
legs of said lever being between said ears and being connected to said rocking bar for oscillating the bar,
a projecting tip on said bolt element being engageable with said keeper pocket,
said rotatable manipulating member being between said bolt element and said hollow member,
rotating connection means between said manipulating member and said bolt elements whereby said bolt element is rotated when said manipulating element is turned, said connecting means being slideable longitudinally of the bolt element to permit reciprocation of said bolt element,
and coacting connecting elements between said hollow member and said bolt element converting rotation of said bolt element into reciprocation of said bolt element.

8. The manipulating handle specified in claim 7, and said coacting connecting element including a projection extending from said hollow member into a slanted groove in the periphery of the bolt element,
and resilient means in said manipulating member urging said bolt element toward said keeper socket.

9. The manipulating handle specified in claim 8, and said rotating connecting means including a pin extended from said manipulating member into said bolt element, and said bolt element having a longitudinal slot therein riding on said pin during reciprocation of said bolt element.

* * * * *